INVENTOR.
Chris Gerst.
BY
ATTORNEYS.

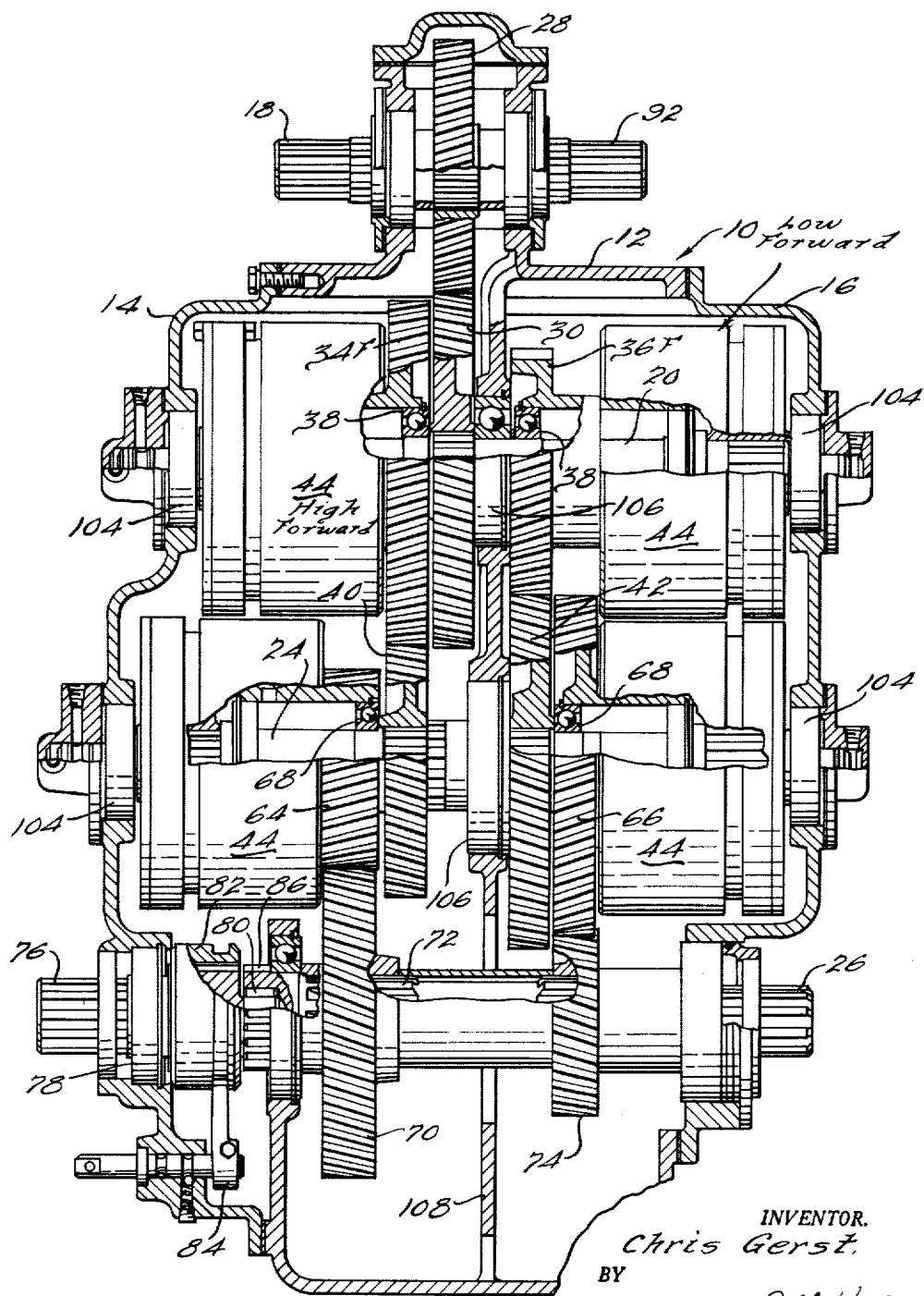

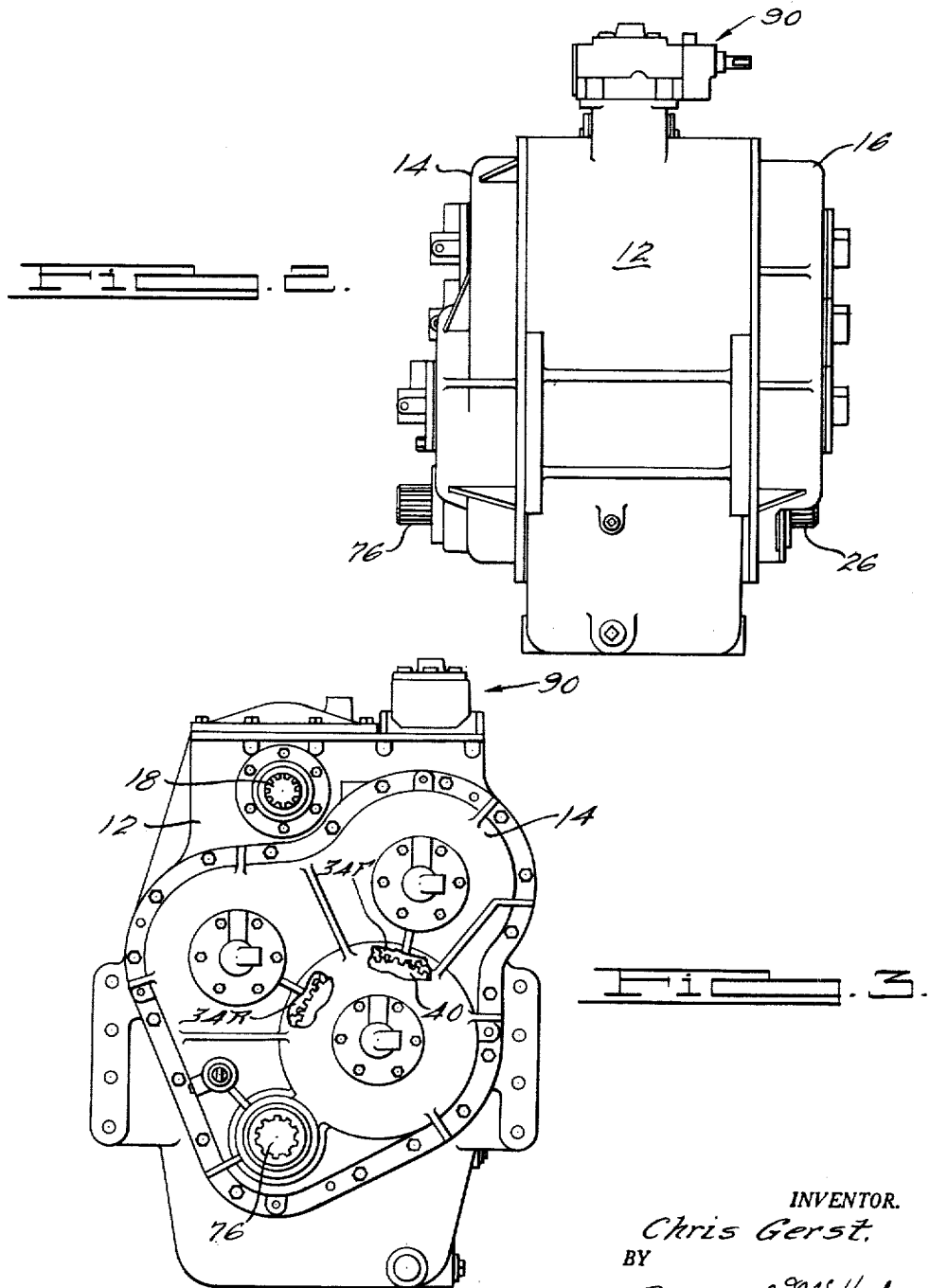

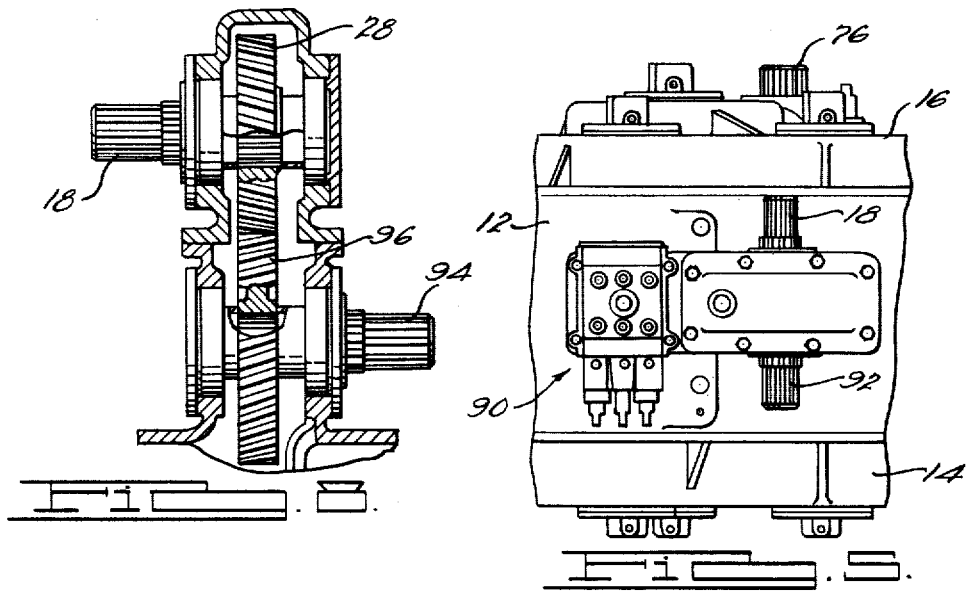
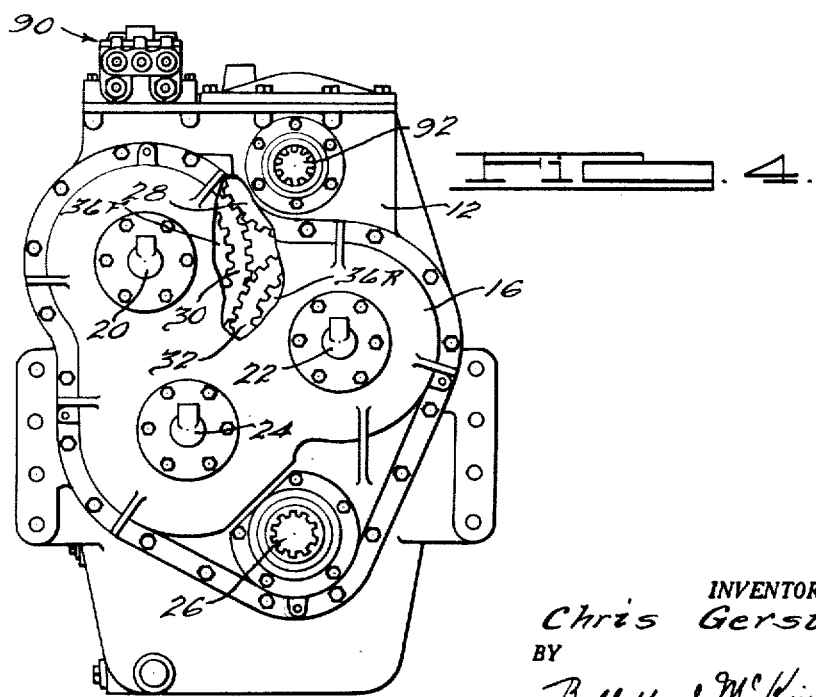

United States Patent Office 3,102,432
Patented Sept. 3, 1963

3,102,432
MULTIPLE SPEED FORWARD AND REVERSE TRANSMISSION
Chris Gerst, Detroit, Mich., assignor, by mesne assignments, to Dana Corporation, a corporation of Virginia
Filed Jan. 25, 1961, Ser. No. 84,884
5 Claims. (Cl. 74—360)

This invention relates to transmissions and has particular reference to a multiple speed forward and reverse transmission particularly adapted to provide a drive between the engine and front and rear wheels of a vehicle such as an off-the-road vehicle.

The transmission of this invention is designed to provide a four speed forward or reverse drive to the rear wheels of a vehicle or to both the front and rear wheels as desired. A four speed forward and reverse transmission suitable for this purpose is shown in my copending application Serial No. 846,482, filed October 14, 1959, now Patent No. 2,972,901 issued Feb. 28, 1961. The transmission disclosed herein is somewhat simpler and less expensive to manufacture than the transmission shown in said copending application and contains certain other improvements thereon.

A principal object of the invention is to provide a new and improved multiple speed forward and reverse transmission for off-the-road vehicles.

Another object of the invention is to provide a transmission of the type described which is of simplified design but rugged in construction and which offers certain advantages for servicing the various parts thereof.

Other and further objects of the invention will be apparent from the following description and claims and may be understood by reference to the accompanying drawings, of which there are five sheets, which by way of illustration show preferred embodiments of the invention and what I now consider to be the best mode of applying the principles thereof. Other embodiments of the invention may be used without departing from the scope of the present invention as set forth in the appended claims.

In the drawings:

FIG. 1 is a developed sectional view through a transmission embodying the present invention;

FIG. 2 is a side elevational view of the transmission;

FIG. 3 is an end elevational view;

FIG. 4 is an elevational view illustrating the opposite end of the transmission;

FIG. 5 is a fragmentary top plan view of the transmission;

FIG. 8 is a fragmentary sectional view illustrating a further modified form of the invention.

Figure 6:
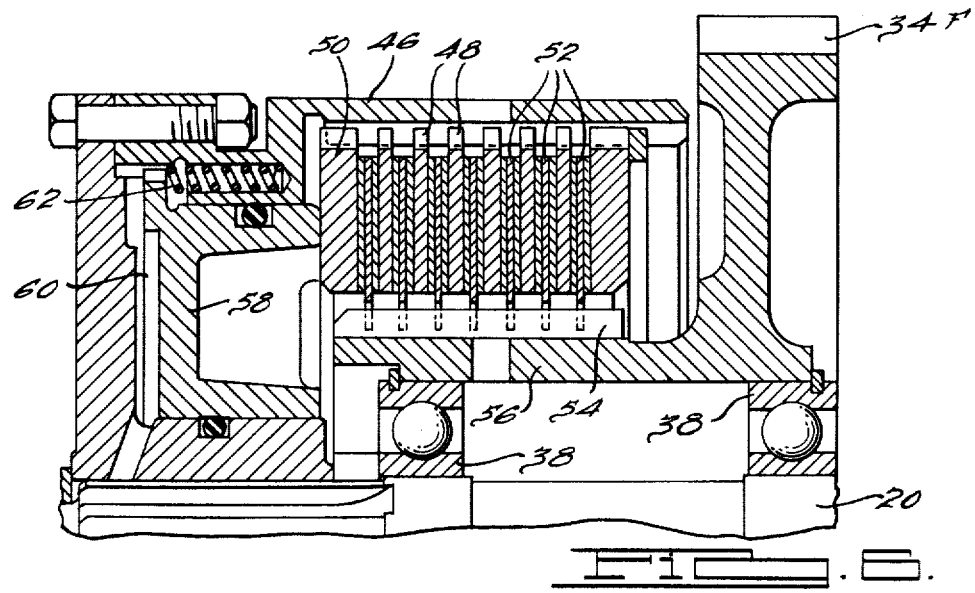
FIG. 6 is an enlarged fragmentary sectional view illustrating the construction of the clutches used in the transmission.

The transmission includes a housing indicated generally at 10 which is comprised of a main casting which is open at its opposite sides, as shown in FIG. 1, and separate cover castings 14 and 16 closing the open sides of the main casting 12. The transmission further includes an input shaft 18, a pair of clutch shafts 20 and 22, a countershaft 24 and an output shaft 26.

Figure 9:
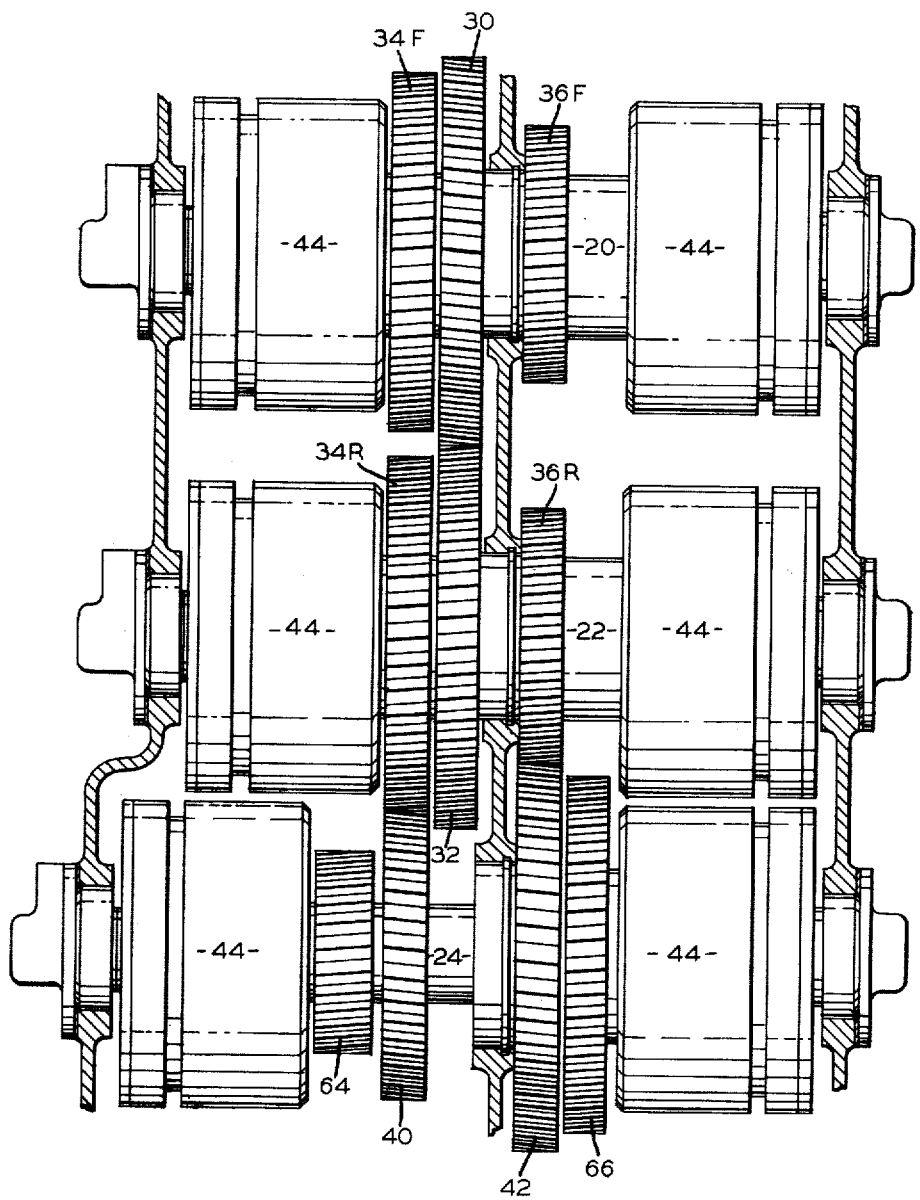
FIG. 9 is a developed sectional view through a portion of the transmission of FIG. 1 showing the relationship of the clutch shafts and countershaft.

In the form of the invention shown in FIG. 1 the input shaft 18 has a gear 28 secured thereon and constantly meshing with a gear 30 secured on the clutch shaft 20 for rotation therewith. As clearly shown in FIG. 9, a gear 32 similar to the gear 30 is secured on the clutch shaft 22 for rotation therewith and is constantly meshed with the gear 30 so that the clutch shafts 20 and 22 are geared together so as to be constantly driven by the input shaft 18. A high speed forward drive gear 34F and a low speed forward drive gear 36F are rotatably journaled on the forward drive clutch shaft 20 by means of bearings 38 and, like high and low speed reverse drive gears 34R and 36R, are similarly journaled for rotation on the reverse drive clutch shaft 22. Both of the drive gears 34F and 34R are meshed with a gear 40 which is secured on the countershaft 24 for rotation therewith, as shown in FIG. 3. Both of the drive gears 36F and 36R are similarly meshed with a gear 42 which is also secured on the countershaft 24 for rotation therewith. Each of the forward and reverse drive gears 34F and 34R and 36F and 36R on each of the clutch shafts 20 and 22 are provided with a clutch 44 which is normally disengaged and, when engaged, is operable to couple the gear associated therewith to the clutch shaft 20 or 22 on which such gear is journaled.

All four of the clutches 44 on the clutch shafts 20 and 22 are of the construction as shown in FIG. 6. This clutch, which is operable when engaged to couple the high speed forward gear 34F to the clutch shaft 20, is of the multiple disc type and includes a cylindrical drum 46 having a series of clutch plates 48 splined thereto and a pressure plate 50 for effecting frictional engagement of the clutch plates 48 with the clutch discs 52, which have friction lining thereon and have a splined connection as at 54 with the hub 56 of the gear 34F. An annular piston 58 carried by the drum 46 is adapted to be actuated by hydraulic fluid under pressure supplied to the cylinder 60 to effect engagement of the clutch thereby to couple the gear 34F to the shaft 20 through the drum 46 which is splined onto the end of the shaft 20. Springs 62 effect disengagement of the clutch when the hydraulic fluid is exhausted from the cylinder 20.

The clutches 44 on the clutch shafts 20 and 22 are selectively engageable so that a selected one of the drive gears 34F, 34R, 36F and 36R may be coupled to the clutch shaft on which it is mounted, depending upon the direction of drive and the speed ratio that is desired. The countershaft 24 may therefore be driven in a direction to provide forward high speed drive of the vehicle from the forward drive gear 34F through the gear 40, or to provide a forward low speed drive from the drive gear 36F through the gear 42. The countershaft 24 therefore may be driven at either of two selected speeds in either forward or reverse direction.

The countershaft has a pair of gears 64 and 66 rotatably journaled thereon by means of bearings 68, and each of the gears 64 and 66 has a clutch 44 associated therewith which is selectively engageable to couple such gear to the countershaft 24. The gear 64 is meshed with a gear 70 which is secured on the output shaft 26 by means of splines 72, and the gear 66 is meshed with a smaller gear 74 which is splined onto the output shaft 26. The clutches 44 on the countershaft 24 may be identical to the clutches previously described and are selectively engageable so that the output shaft 26 may be driven from the countershaft 24 either through gears 64 and 70 or through gears 66 and 74, thereby providing a four speed forward or reverse drive for the output shaft 26.

The right-hand end of the output shaft shown in FIG. 1 may be adapted to drive the rear wheels of the vehicle and the output shaft may include an extension 76 at the other side of the transmission which is rotatably journaled in a bearing 78 in the cover casting 14 and also in the end of the output shaft 26 by means of a bearing 80.

The extension 76 of the output shaft is provided with a clutch member 82 which is splined thereon and which may be shifted axially by means of a shifting yoke 84 into engagement with splines 86 on the end of the output shaft 26 so that the extension 76 may be driven with the main output shaft so as to provide a drive for the front wheels of the vehicle.

The transmission is provided with suitable control valve means which are indicated at 90 in FIGS. 2 to 5, and the control arrangement is such that only a selected one of the four clutches associated with the clutch shafts 20 and 22 may be engaged at one time and only a selected one of the two clutches associated with the countershaft may be engaged at one time.

Input shaft 18 may be extended to provide a power takeoff shaft 92 as shown in FIG. 1, or a separate power takeoff shaft 94 having a gear 96 secured thereon and meshed with the gear 28 may be provided, as shown in the modification illustrated in FIG. 8. In this case the gear 96 is meshed with the gear 30 which is secured on the clutch shaft 20 and provides additional reduction between shaft 18 and gear 30.

Figure 7:
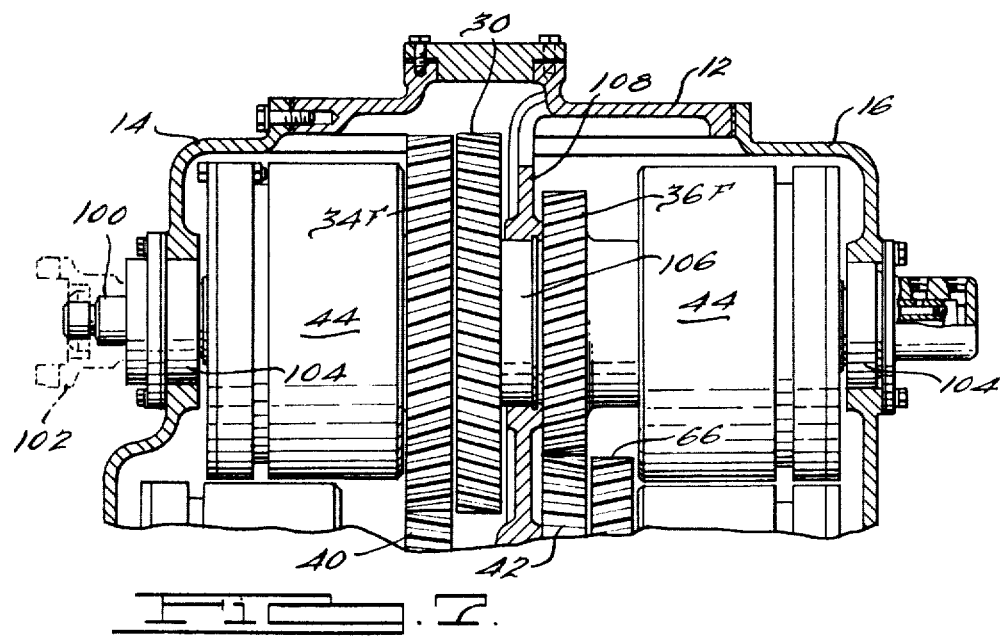
FIG. 7 is a fragmentary sectional view illustrating a modified form of the invention.

In the modification shown in FIG. 7 the construction is the same as that already described, except that the clutch shaft 20 may have one end 100 thereof extending through the cover casting 14 and provided with a universal joint 102 by means of which the shaft 20 may be driven directly from the engine so that the shaft 20 in this modification provides the input shaft of the transmission.

It is to be noted that the opposite ends of the clutch shafts 20 and 22 and the countershaft 24 are rotatably journaled in bearings 104 in the cover castings 14 and 16. These shafts are also journaled in additional bearings 106 which are carried by a centrally disposed web or bearing plate 108 which is integral with the main casting 12 and is disposed between and parallel to the open sides of the main casting. All of the clutches 44 are located at the ends of the shafts on which they are mounted so as to be easily accessible for servicing upon removal of one of the cover castings 14 and 16. All of the gears mounted on the clutch shafts and the countershaft are located between the clutches thereon so that it is not necessary to remove any of the gears in order to obtain access to the clutches. This arrangement facilitates servicing and repair of the clutches of the transmission.

The transmission disclosed herein provides a very rugged and durable transmission adapted to provide a four speed forward and reverse drive for a vehicle with a minimum number of parts and at the same time provides a transmission which has a very compact design that may be easily serviced.

The gears 30 and 32 may be made so as to drive the reverse shaft 22 at the same or at a different speed than the shaft 20, thus providing different speed ratios in reverse than in forward gear. This along with the various arrangements disclosed for driving the shaft 20 makes it possible to adapt the transmission for a wide variety of uses and conditions, and makes it possible to have a line or series of models using the same basic parts.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A forward and reverse reduction transmission comprising a pair of clutch shafts geared together for rotation in opposite directions, a countershaft having first and second gears fixed thereon for rotation therewith, a first set of gears including a forward drive gear journaled on one clutch shaft and a reverse drive gear journaled on the other clutch shaft meshed with said first gear on said countershaft, a second set of gears including a forward drive gear journaled on one clutch shaft and a reverse drive gear journaled on the other clutch shaft meshed with said second gear on said countershaft, a normally disengaged clutch operatively disposed between each of said forward and reverse drive gears and its respective clutch shaft and operable when engaged for coupling such gear with the clutch shaft on which it is journaled, a plurality of gears journaled on said countershaft for rotation relative thereto, a normally disengaged clutch operatively disposed between each gear of said plurality of gears on said countershaft and said countershaft and operable when engaged for coupling such gear with said countershaft for rotation therewith, and an output shaft disposed parallel to said countershaft and having gears thereon each meshed with one of said plurality of gears on said countershaft, said clutches on said clutch shaft and said countershaft being selectively engageable.

2. A transmission according to claim 1 including a housing for said transmission comprising a main casting open at its opposite sides and a separate cover casting closing each of said sides of said main casting, the opposite ends of said clutch shafts, said countershaft and said output shaft being rotatably journaled in said cover castings, said main casting having an integral bearing plate disposed between and parallel to said open sides and providing additional bearing support for at least some of said shafts.

3. A transmission according to claim 2 wherein said clutches on said clutch shafts and said countershaft are disposed at the outer ends of their respective shafts so as to be accessible upon removal of said cover castings and wherein all of the gears on such shafts are disposed between the clutches thereon.

4. A forward and reverse reduction transmission comprising a pair of clutch shafts geared together for rotation in opposite directions, an input shaft geared to one of said clutch shafts for driving said clutch shafts, a countershaft having first and second gears fixed thereon for rotation therewith, a first set of gears including a forward drive gear journaled on one clutch shaft and a reverse drive gear journaled on the other clutch shaft both meshed with said first gear on said countershaft, a second set of gears including a forward drive gear journaled on one clutch shaft and a reverse drive gear journaled on the other clutch shaft both meshed with said second gear on said counter shaft, a normally disengaged clutch operatively disposed between each of said forward and reverse drive gears and its respective clutch shaft and operable when engaged for coupling such gear with the clutch shaft on which it is journaled, a plurality of gears journaled on said countershaft for rotation relative thereto, a normally disengaged clutch operatively disposed between each gear of said plurality of gears on said countershaft and said countershaft and operable when engaged for coupling such gear with said countershaft for rotation therewith, and an output shaft disposed parallel with said countershaft and having gears thereon each meshed with one of said plurality of gears on said countershaft, said clutches on said clutch shafts and said countershaft being selectively engageable, and a power take-off shaft driven with said input shaft.

5. A forward and reverse reduction transmission comprising a pair of parallel drive shafts geared for rotation together, a countershaft having first and second gears fixed thereon for rotation therewith, a first set of gears including a first drive gear journaled on one drive shaft and a first drive gear journaled on the other drive shaft meshed with said first gear on said countershaft, a second set of gears including a second drive gear journaled on one drive shaft and a second drive gear journaled on the other drive shaft meshed with said second gear on said countershaft, a normally disengaged clutch operatively disposed between each of said first and second drive gears and its respective shaft and operable when engaged for coupling such gear with the shaft on which it is journaled, a plurality of gears journaled on said countershaft for rotation relative thereto, a normally disengaged clutch operatively disposed between each gear of said plurality of gears journaled on said countershaft and said countershaft and operable when engaged for selectively coupling such gear with said countershaft for rotation therewith, and an output shaft having gears thereon geared with said plurality of gears journaled on said countershaft, said clutches being selectively engageable hydraulically actuated multiple disc clutches disposed at the outer ends of their respective shafts.

References Cited in the file of this patent

UNITED STATES PATENTS

| | | |
|---|---|---|
| 2,712,245 | Lee | July 5, 1955 |
| 2,804,780 | Gerst | Sept. 3, 1957 |
| 2,825,232 | Sieving et al. | Mar. 4, 1958 |
| 2,958,231 | Gerst | Nov. 1, 1960 |
| 2,972,901 | Gerst | Feb. 28, 1961 |

UNITED STATES PATENT OFFICE
CERTIFICATE OF CORRECTION

Patent No. 3,102,432                 September 3, 1963

Chris Gerst

It is hereby certified that error appears in the above numbered patent requiring correction and that the said Letters Patent should read as corrected below.

Column 4, line 11, for "shaft", second occurrence, read -- shafts --.

Signed and sealed this 25th day of February 1964.

(SEAL)
Attest:
ERNEST W. SWIDER

Attesting Officer

EDWIN L. REYNOLDS

Acting Commissioner of Patents